Nov. 25, 1941.    J. H. DUNLEVY    2,264,147
MACHINERY PACKING OF THE AUTOMATIC TYPE
Filed July 8, 1941
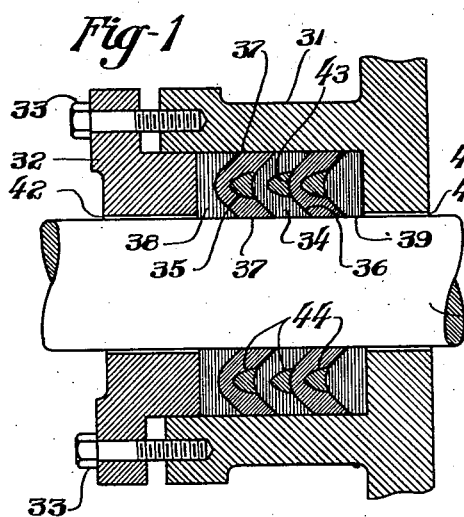
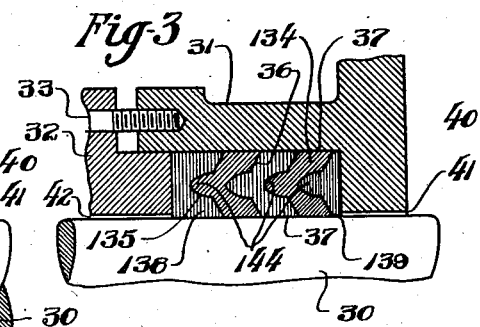
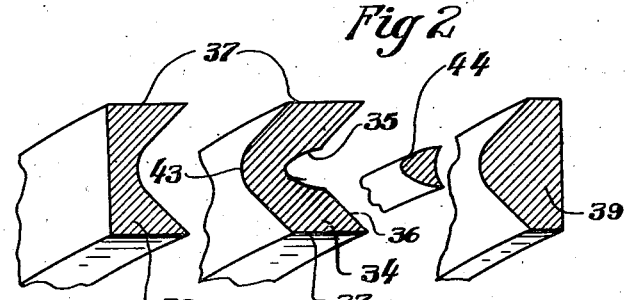
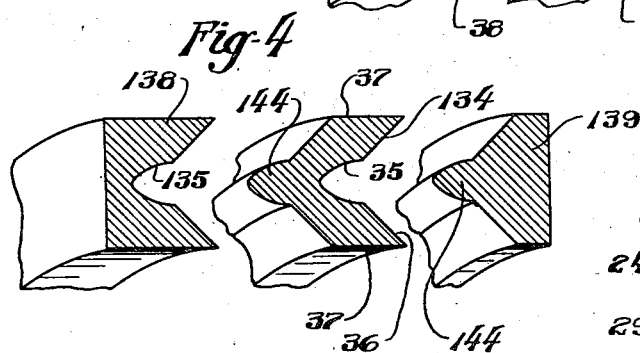
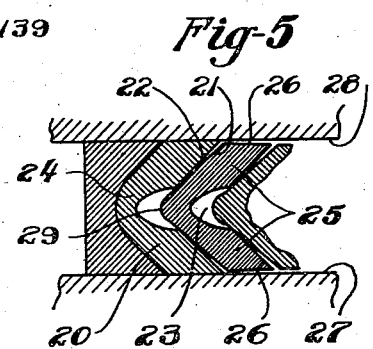
INVENTOR
Joe H. Dunlevy
BY Fraser, Myers & Manley,
ATTORNEYS.

Patented Nov. 25, 1941

2,264,147

UNITED STATES PATENT OFFICE 2,264,147

MACHINERY PACKING OF THE AUTOMATIC TYPE

Joe H. Dunlevy, Palmyra, N. Y., assignor to The Garlock Packing Company, Palmyra, N. Y., a corporation of New York Application July 8, 1941, Serial No. 401,451

5 Claims. (Cl. 288—5)

This invention relates to machinery packing of the automatic type, an illustrative example of which is disclosed in the patent to Hubbard et al., No. 1,771,890, which was issued to applicant's assignee on July 29, 1930.

It is an object of the present invention to provide an improved packing of the automatic type such that the elements of an assembly in which it is used will not be distorted or disarranged when subjected to extremely high pressures and thereby impair the seal.

In the accompanying drawing illustrating two alternative, preferred forms of the invention—

Figure 1 is a cross-sectional view of a conventional form of stuffing-box in which is installed a packing assembly including elements embodying one form of the invention.

Fig. 2 is a view, partly in cross section and partly in perspective, illustrating fragmentary portions of the packing elements, shown in Fig. 1, as having been disassembled.

Fig. 3 is a cross-sectional view of a conventional stuffing-box, such as is illustrated by Fig. 1, in which is installed a packing assembly including packing elements embodying an alternative, specific form of the invention.

Fig. 4 is a view, partly in cross section and partly in perspective, illustrating fragments of packing elements such as are disclosed as a part of Fig. 3, the same having been disassembled.

Fig. 5 is a cross-sectional view of an assembly of automatic packing elements such as are disclosed in the above-mentioned patent to Hubbard et al., the relative elements being represented as having been distorted and displaced, as is likely to happen to such packing elements when subjected to excessively high pressures.

The automatic packing disclosed in the patent to Hubbard et al., illustrated diagrammatically by Fig. 5 of the drawing of this application, comprised packing stock of relatively flat V-shaped form in cross section, rings 20 of which might be nested in an assembly as illustrated in Fig. 5, with their convex surfaces 21 nested in concave surfaces 22 of adjoining rings.

The concave surface portions 22 of the rings 20 were grooved as at 23 to provide zones 24 of reduced thickness adapted to serve as hinge-like portions about which the outlying elements 25 might be bent or deflected outwardly so as to bring their sealing surfaces 26 into close contact with the surfaces 27 of the piston and 28 of the stuffing-box with which the packing was associated.

It was intended that the packing of the prior art as illustrated by Fig. 5 should be assembled in the stuffing-box with its outwardly inclined surfaces 21 and 22 directed towards the source of fluid pressure to be opposed, so that the confined fluid, when forced between the surfaces of the packing rings, would tend to flatten them and thus force the outer portions into firm contact with the inner surface of the stuffing-box and the inner portions into firm contact with the outer surface of the piston.

It will be apparent that when automatic packing such as that illustrated by Fig. 5 is used, the frictional engagement between the packing and the piston, when the fluid pressure in the engine or pump with which the packing is used is increased to set the same in operation, will be much greater than it is when the fluid pressure is reduced and the engine or pump permitted to come to rest.

It has been found, as a result of long experience in the exploitation of automatic packings of the above-described character, that when they are used as the sealing element of an engine or a pump or other mechanical unit in which the fluid to be sealed must be subjected to extremely high pressures, the sealing effect of such packings, which is otherwise highly satisfactory, is impaired, for the reason that the protuberant portions 29 of the packing rings are forced or wedged into the channels or grooves 23 of adjoining rings, thereby causing the outlying flaring elements 25 to be distorted or disarranged so as to separate portions of the rings adjacent their sealing surfaces and so as to also separate the sealing surfaces from the walls of the stuffing-box and piston, as indicated in Fig. 5 in which the disarrangement or distortion is grossly exaggerated for purposes of illustration.

For the foregoing reasons it is an object of the present invention to produce packing stock including the automatically variable sealing properties of the above-described packing of the prior art, but of relative forms such as to prevent the wedging action of one ring with respect to an adjoining ring when subjected to extremely high pressure so as to impair the effectiveness of the seal.

The form of the herein-disclosed invention which is illustrated by Fig. 1 is represented as a sealing agent for a piston rod 30 adapted to be reciprocated through a conventional stuffing-box 31 having the usual gland 32 and bolts 33 by which the gland may be caused to adjust the pressure of packing enclosed within the stuffing-box.

The packing assembly illustrated by Figs. 1 and 2 includes relatively flat V-shaped packing rings 34 having annular grooves or channels 35 along their concave surfaces 36 midway, or substantially midway, between their sealing surfaces 37, the said V-shaped rings being provided with end adapter rings 38, 39, one capping the convex surface portion of one end ring of the assembly of V-shaped rings, and the other nested in the concave surface portion of the other end ring of the assembly of V-shaped rings, all in conformity with the assembly of packing elements illustrated in Fig. 1 of the patent to Hubbard et al.

If the packing illustrated in Fig. 1 is intended to prevent the escape of fluids, such as a liquid or a gas maintained at a pressure materially above atmospheric pressure, from the space 40 through the annular orifice 41 to the annular orifice 42 between the shaft and the gland of the stuffing-box, the elements of the packing assembly will be mounted in the stuffing-box with their flaring surfaces positioned as shown, with the concave surfaces directed towards the source of pressure. On the other hand, if the packing is relied upon as a seal for a mechanical unit in which a vacuum is to be maintained, the positions of the elements of the packing assembly should be reversed in order to prevent air from entering the orifice 42 between the cylinder and the gland of the stuffing-box and making its way to the orifice 41 through which it might be admitted to the vacuum chamber.

In order that, when subjected to extremely high pressure, the packing elements of the form of the invention illustrated by Fig. 1 may not be distorted or disarranged by the wedging of the protuberant portions 43 of one ring into the opposed grooved portions 35 of another, in the manner in which the effectiveness of automatic packings of the prior art is sometimes impaired, there have been included, as important elements of the herein-disclosed invention, intervening rings 44 of cross-sectional forms such as to fill the grooves or channels 35 of the V-shaped rings and thereby prevent the protuberance of one ring from being forced into the channel in an adjoining ring.

The forms and dimensions of the V-shaped rings 34, the end adapter rings 38, 39, and the filler rings 44, are to be such that the various surfaces which are mounted in opposition to one another will be of complemental form such that the opposite surfaces of the V-shaped rings will be in continuous surface-to-surface contact from one sealing surface to the other.

In the alternative form of the invention illustrated by Figs. 3 and 4, the elements of the packing assembly differ from those of the assembly illustrated as a part of Fig. 1 only in that the V-shaped packing rings 134 and the end adapter ring 139 are provided with integral, annular, protuberant portions 144 of cross-sectional forms and dimensions conforming with those of the intervening rings 44 of the form of the invention illustrated by Fig. 1, so that the protuberances 144 may be nested in the channels of the concave surface portions 36 of adjoining rings.

In order that the V-shaped ring at the left end of the assembly illustrated by Fig. 3 may be made of the same stock as is used in making the other V-shaped rings of the assembly, the end adapter ring 138 may be channeled by a groove 135 of a form such as to be complementary with respect to the annular protuberant portion 144 of the adjoining V-shaped ring.

Except as to the distinctive feature of the form of the invention illustrated by Figs. 3 and 4 to which attention has been directed, the elements illustrated as parts of Figs. 3 and 4 conform exactly with those illustrated as parts of Figs. 1 and 2; wherefore, such corresponding parts are designated by the same reference characters.

Although, for purposes of illustration, the herein-disclosed invention has been represented as one adapted to pack the joint about a reciprocating piston, it will be apparent that it is not intended to be limited to any such special use as distinguished from the sealing of joints generally about rods, plungers, rotary shafts and the like, which are subjected to liquid or fluid pressure.

The foregoing description and the drawing therein referred to are not intended to indicate that packings embodying the invention are necessarily limited to elements in the forms of continuous rings as distinguished from rings having beveled ends or abutting ends, or ring-like elements of packing applied in the form of a helix or spiral, in accordance with the well-known practice of the prior art. What is of importance is that the stock represented by the element 134, 144 of Figs. 3 and 4 and the composite stock represented by the elements 34 and 44 of Figs. 1 and 2, when assembled, shall be of forms such as to produce packing elements having oppositely disposed surfaces which are continuously complementary from one marginal sealing surface to the other.

The various elements of the disclosed packing assemblies may be made of soft metal, rubber composition or other appropriate material adapted to be brought into a snug sealing contact with the surfaces against which they are intended to effect a seal, and they should also be of appropriate material to withstand any damaging effect which might result from contact with fluids or liquids to which they are exposed.

The invention is not intended to be limited to the specific forms herein disclosed for purposes of illustration, but should be regarded as including modifications and variations thereof within the scope of the appended claims.

What is claimed is:

1. A packing assembly comprising a plurality of interrelated, annular elements including rings of resilient material of relatively flat V-shaped cross-sectional form each having a pair of oppositely disposed sealing surfaces connected by oppositely disposed surfaces, one convex and the other concave, of which the convex surface portion of one may be nested in the concave surface portion of another, the said rings being channeled between their sealing surfaces by grooves, the cross-sectional forms and dimensions of the rings and their grooves being such as to materially reduce the thickness of annular portions of the said rings concentric with but lying at a distance from their margins and thereby adapt the portions thus thinned to serve as hinge-like connections for the oppositely related, outwardly flaring parts, and the various elements of the assembly being of forms and dimensions such that surface portions of each of the V-shaped rings will make contact with complementary surface portions of other, adjoining elements continuously from one of its sealing surfaces to the other.

2. A packing assembly, conforming substantially with that defined by claim 1, of which the interrelated, annular elements include rings of appropriate form and dimensions to fill the spaces between the grooved surface portions of the channeled elements and the opposed surface portions of adjoining elements.

3. A packing assembly, conforming substantially with that defined by claim 1, of which each of the annular elements which is opposed by a grooved surface portion of an adjoining element is provided with an annular protuberant portion of such form and dimensions that the opposed surface portions of said elements will be complementary throughout.

4. Composite packing material consisting of two elements of different cross-sectional form, having complementary surface portions adapting them for conjoint use as a unit of a packing assembly, one element of said unit being of a relatively flat, V-shaped cross-sectional form, having oppositely disposed, longitudinal sealing surfaces connected by oppositely disposed, longitudinal surfaces, one convex and the other concave, of forms such that the convex surface portion of one such element may be nested in the concave surface portion of an adjoining one, said element being longitudinally channeled by a groove extending along its concave surface portion and so dimensioned and positioned as to materially reduce its thickness and thereby adapt the portion so thinned to serve as a hinge-like connection for the oppositely related, outwardly flaring parts, the other element of said two-part packing unit being of cross-sectional form and dimensions such that it may be used either as a filler for the groove of the V-shaped element, or as a cap for the central part of its convex surface portion, the relative cross-sectional forms of the two elements being such that when assembled in either way the combined packing structure will have oppositely disposed complementary surfaces extending continuously from one of its sealing surfaces to the other.

5. Resilient packing stock, of relatively flat, V-shaped cross-sectional form, having oppositely disposed, longitudinal sealing surfaces connected by oppositely disposed longitudinal surfaces, one convex and the other concave, of forms such that the convex surface portion of one such element may be nested in the concave surface portion of an adjoining one, said stock being longitudinally channeled by a groove extending along the central portion of its concave surface and having a protuberance extending lengthwise along the central portion of its convex surface, the groove and protuberance being so disposed as to reduce the thickness of the stock along zones lying at material distances from its margins and thereby adapt the portions thus thinned to serve as hinge-like connections for the oppositely related, outwardly flaring parts, and the relative forms of the concave portion including its groove and the convex portion including its protuberance being such that surfaces of adjoining sections made from such stock will have continuous complemental surface portions from one sealing surface to the other.

JOE H. DUNLEVY.